(12) United States Patent
Vaikar et al.

(10) Patent No.: US 12,425,314 B2
(45) Date of Patent: Sep. 23, 2025

(54) PACKET FLOW MONITORING WITH ATTRIBUTE-TO-IDENTIFIER MAPPING

(71) Applicant: VMware, INC., Palo Alto, CA (US)

(72) Inventors: Amol Manohar Vaikar, Maharashtra (IN); Vishal Ranjan, Maharashtra (IN); Avinash Nigam, Uttar Pradesh (IN); Ravi Singhal, Maharashtra (IN)

(73) Assignee: VMware LLC, Palo Alto, CA (US)

( * ) Notice: Subject to any disclaimer, the term of this patent is extended or adjusted under 35 U.S.C. 154(b) by 717 days.

(21) Appl. No.: 17/741,458

(22) Filed: May 11, 2022

(65) Prior Publication Data

US 2023/0370346 A1  Nov. 16, 2023

(51) Int. Cl.
*H04L 43/026* (2022.01)
*H04L 43/022* (2022.01)
*G06F 9/455* (2018.01)

(52) U.S. Cl.
CPC .......... *H04L 43/026* (2013.01); *H04L 43/022* (2013.01); *G06F 9/45558* (2013.01); *G06F 2009/45587* (2013.01)

(58) Field of Classification Search
CPC ............................ H04L 43/026; H04L 43/022
USPC ........................................................ 370/241
See application file for complete search history.

(56) References Cited

U.S. PATENT DOCUMENTS

| | | | | |
|---|---|---|---|---|
| 8,463,881 B1* | 6/2013 | Baker | ................. | G06F 13/4027 709/229 |
| 2015/0127613 A1* | 5/2015 | Tang | ....................... | G06F 16/23 707/646 |
| 2016/0142314 A1* | 5/2016 | Parsa | ................. | H04L 41/0803 370/235 |
| 2023/0274751 A1* | 8/2023 | Kaneko | ................... | G10L 21/00 704/200 |

* cited by examiner

*Primary Examiner* — Faisal Choudhury
(74) *Attorney, Agent, or Firm* — King Intellectual Asset Management

(57) ABSTRACT

Example methods and systems for packet flow monitoring are described. In one example, a first computer system may detect a flow of packets along a datapath between a source and a destination and determine source attribute information associated with the source and destination attribute information associated with the destination. The first computer system may perform attribute-to-identifier mapping by (a) mapping the source attribute information to a source identifier having a reduced size compared to the source attribute information, and/or (b) mapping the destination attribute information to a destination identifier having a reduced size compared to the destination attribute information. The first computer system may generate flow information that includes (a) the source identifier identifying the source and/or (b) the destination identifier identifying the destination; and interact with a second computer system, or storage accessible by the second computer system, to enable the second computer system to obtain the flow information.

21 Claims, 7 Drawing Sheets

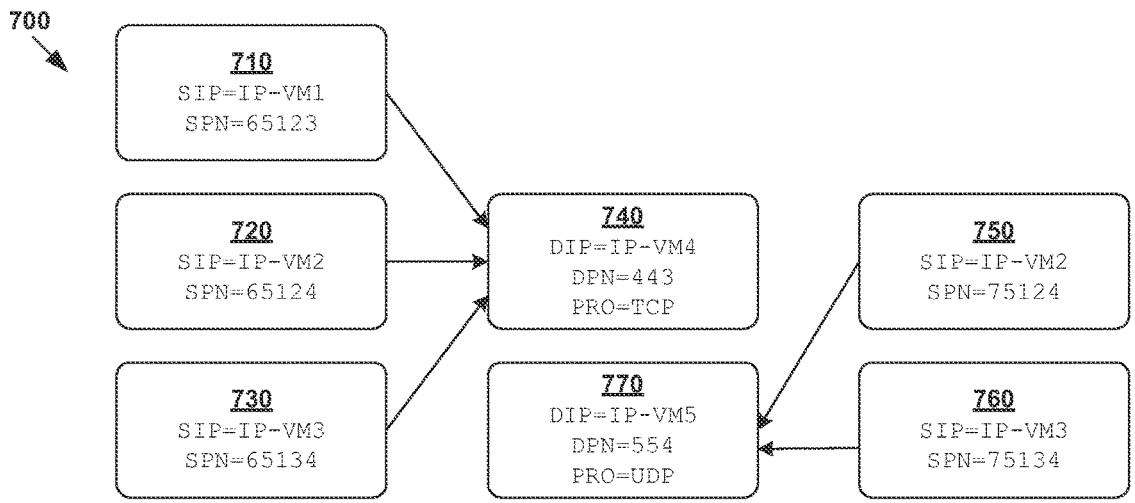

| SIP | SPN | DIP | DPN | PRO | OTH | |
|---|---|---|---|---|---|---|
| IP1 (fec1::4001) | 65123 | IP4 (fec0::2001) | 443 | TCP | SET1 | 781 |
| IP2 (fec1::4002) | 65124 | IP4 (fec0::2001) | 443 | TCP | SET2 | 782 |
| IP3 (fec1::4005) | 65134 | IP4 (fec0::2001) | 443 | TCP | SET3 | 783 |
| IP2 (fec1::4002) | 75124 | IP5 (fec0::2001) | 554 | UDP | SET2 | 784 |
| IP3 (fec1::4005) | 75134 | IP5 (fec0::2001) | 554 | UDP | SET3 | 785 |

⇩ Attribute-to-identifier mapping 790

| SRC* | DST | OTHERS | |
|---|---|---|---|
| ID1=HASH(IP1) | ID4=HASH(IP4,443,TCP) | ID6=HASH(SET1), SPN=65123 | 791 |
| ID2=HASH(IP2) | ID4 | ID7=HASH(SET2), SPN=65124 | 792 |
| ID3=HASH(IP3) | ID4 | ID8=HASH(SET3), SPN=65134 | 793 |
| ID2 | ID5=HASH(IP5,554,UDP) | ID7, SPN=75124 | 794 |
| ID3 | ID5 | ID8, SPN=75134 | 795 |

*ID=[HASH(SIP-PREFIX),SIP-SUFFIX] OR
 ID=[HASH(SIP-PREFIX),HASH(SIP-SUFFIX)] OR
 ID=HASH(SIP)

Fig. 7

PACKET FLOW MONITORING WITH ATTRIBUTE-TO-IDENTIFIER MAPPING

BACKGROUND

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc. Since various network issues may affect traffic among VMs deployed in the SDN environment, it is desirable to perform packet flow monitoring for better visibility and to facilitate network troubleshooting and diagnosis.

BRIEF DESCRIPTION OF DRAWINGS

FIG. 7 is a schematic diagram illustrating a third example of attribute-to-identifier mapping during packet flow monitoring.

DETAILED DESCRIPTION

Figure 1:
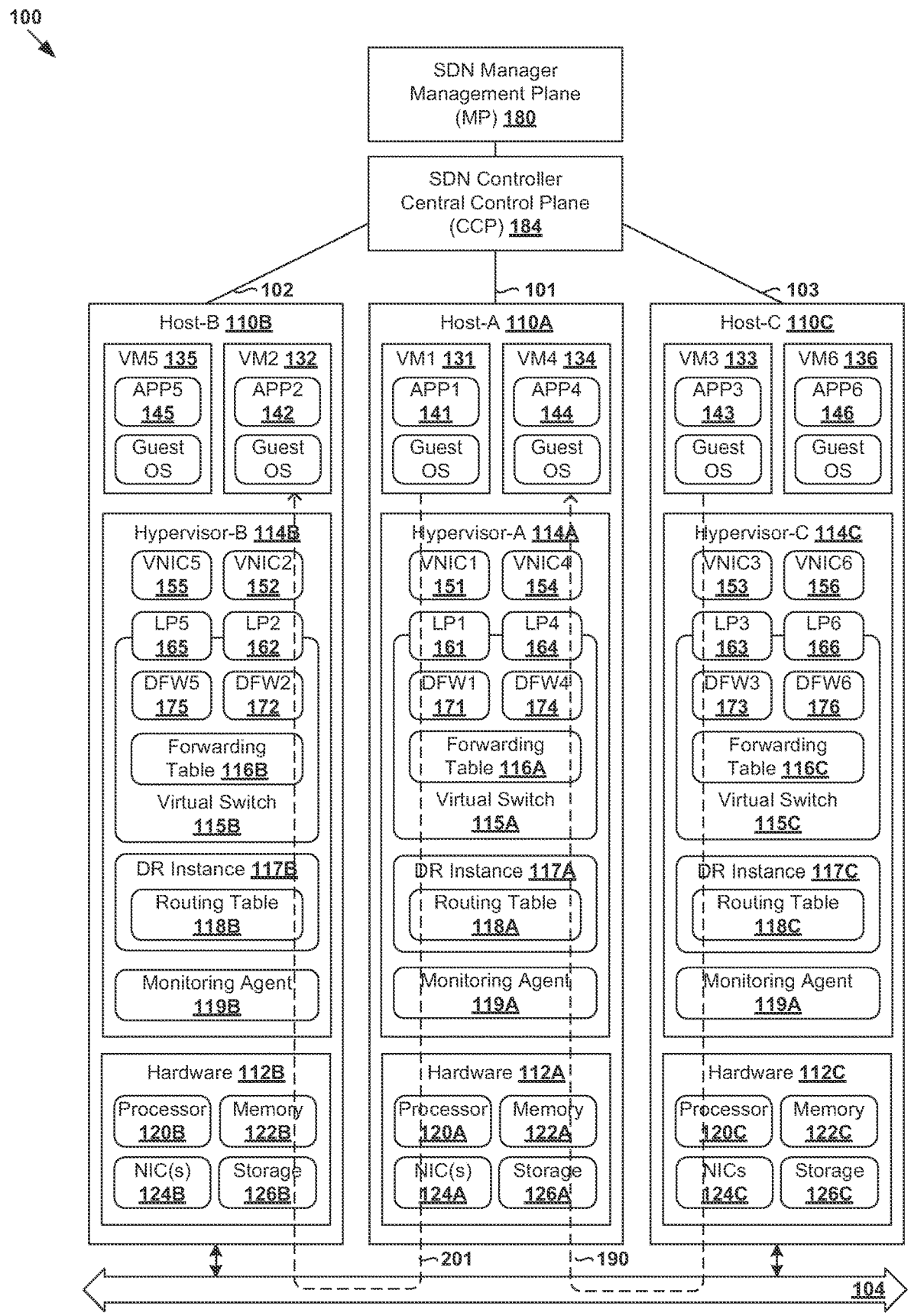
FIG. 1 is a schematic diagram illustrating an example software-defined networking (SDN) environment in which packet flow monitoring may be performed.

According to examples of the present disclosure, packet flow monitoring may be implemented in a more resource-efficient manner. One example may involve a first computer system (e.g., host-A 110A in FIG. 1) detecting a flow of one or more packets along a datapath between a source and a destination (e.g., VM1 131 and VM2 132); and determining source attribute information associated with the source and destination attribute information associated with the destination. The first computer system may perform attribute-to-identifier mapping by (a) mapping the source attribute information to a source identifier having a reduced size compared to the source attribute information and/or (b) mapping the destination attribute information to a destination identifier having a reduced size compared to the destination attribute information.

The first computer system may generate flow information that includes (a) the source identifier identifying the source and/or (b) the destination identifier identifying the destination. The first computer system may interact with a second computer system (e.g., network monitoring platform 210 in FIG. 2), or storage accessible by the second computer system, to enable the second computer system to obtain the flow information. As will be described further below, the amount of memory, storage and network bandwidth required to store and propagate flow information may be reduced during packet flow monitoring.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first" and "second" are used to describe various elements, these elements should not be limited by these terms. These terms are used to distinguish one element from another. For example, a first element may be referred to as a second element, and vice versa.

Challenges relating to packet flow monitoring will now be explained in more detail using FIG. 1, which is a schematic diagram illustrating example software-defined networking (SDN) environment 100 in which packet flow monitoring may be performed. Depending on the desired implementation, SDN environment 100 may include additional and/or alternative components than that shown in FIG. 1. SDN environment 100 includes multiple hosts 110A-C that are inter-connected via physical network 104. In practice, SDN environment 100 may include any number of hosts (also known as a "host computers", "host devices", "physical servers", "server systems", "transport nodes," etc.). Each host may be supporting tens or hundreds of virtual machines (VMs).

Each host 110A/110B/110C may include suitable hardware 112A/112B/112C and virtualization software (e.g., hypervisor-A 114A, hypervisor-B 114B, hypervisor-C 114C) to support various VMs. For example, hosts 110A-C may support respective VMs 131-136 (see also FIG. 2). Hypervisor 114A/114B/114C maintains a mapping between underlying hardware 112A/112B/112C and virtual resources allocated to respective VMs. Hardware 112A/112B/112C includes suitable physical components, such as central processing unit(s) (CPU(s)) or processor(s) 120A/120B/120C; memory 122A/122B/122C; physical network interface controllers (NICs) 124A/124B/124C; and storage disk(s) 126A/126B/126C, etc.

Virtual resources are allocated to respective VMs 131-136 to support a guest operating system (OS) and application(s). For example, VMs 131-136 support respective applications 141-146 (see "APP1" to "APP6"). The virtual resources may include virtual CPU, guest physical memory, virtual disk, virtual network interface controller (VNIC), etc. Hardware resources may be emulated using virtual machine monitors (VMMs). For example in FIG. 1, VNICs 151-156 are virtual network adapters for VMs 131-136, respectively, and are emulated by corresponding VMMs (not shown for simplicity) instantiated by their respective hypervisor at respective host-A 110A, host-B 110B and host-C 110C. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models. There are two versions of IP: IP version 4 (IPv4) and IP version 6 (IPv6) that will be discussed below.

Hypervisor 114A/114B/114C implements virtual switch 115A/115B/115C and logical distributed router (DR) instance 117A/117B/117C to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-C and represented internally using forwarding tables 116A-C at respective virtual switches 115A-C. Forwarding tables 116A-C may each include entries that collectively implement the respective logical switches. Further, logical DRs that provide logical layer-3 connectivity may be implemented collectively by DR instances 117A-C and represented internally using routing tables 118A-C at respective DR instances 117A-C. Routing tables 118A-C may each include entries that collectively implement the respective logical DRs.

Packets may be received from, or sent to, each VM via an associated logical port. For example, logical switch ports 161-166 (see "LP1" to "LP6") are associated with respective VMs 131-136. Here, the term "logical port" or "logical switch port" may refer generally to a port on a logical switch to which a virtualized computing instance is connected. A "logical switch" may refer generally to an SDN construct that is collectively implemented by virtual switches 115A-C in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of a corresponding virtualized computing instance (e.g., when the source host and destination host do not have a distributed virtual switch spanning them).

To protect VMs 131-136 against security threats caused by unwanted packets, hypervisors 114A-C may implement firewall engines to filter packets. For example, distributed firewall engines 171-176 (see "DFW1" to "DFW6") are configured to filter packets to, and from, respective VMs 131-136 according to firewall rules. In practice, network packets may be monitored and filtered according to firewall rules at any point along a datapath from a VM to corresponding physical NIC 124A/124B/124C. In one embodiment, a filter component (not shown) is incorporated into each VNIC 151-156 that enforces firewall rules that are associated with the endpoint corresponding to that VNIC and maintained by respective distributed firewall engines 171-176.

Through virtualization of networking services in SDN environment 100, logical networks (also referred to as overlay networks or logical overlay networks) may be provisioned, changed, stored, deleted and restored programmatically without having to reconfigure the underlying physical hardware architecture. A logical network may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer 2 physical networks.

SDN manager 180 and SDN controller 184 are example network management entities in SDN environment 100. One example of an SDN controller is the NSX controller component of VMware NSX® (available from VMware, Inc.) that operates on a central control plane (CCP). SDN controller 184 may be a member of a controller cluster (not shown for simplicity) that is configurable using SDN manager 180 operating on a management plane (MP). Network management entity 180/184 may be implemented using physical machine(s), VM(s), or both. Logical switches, logical routers, and logical overlay networks may be configured using SDN controller 184, SDN manager 180, etc. To send or receive control information, a local control plane (LCP) agent (not shown) on host 110A/110B/110C may interact SDN controller 184 via control-plane channel 101A/101B/101C.

Hosts 110A-C may also maintain data-plane connectivity among themselves via physical network 104 to facilitate communication among VMs located on the same logical overlay network. Hypervisor 114A/114B/114C may implement a virtual tunnel endpoint (VTEP) (not shown) to encapsulate and decapsulate packets with an outer header identifying the relevant logical overlay network (e.g., using a VXLAN or "virtual" network identifier (VNI) added to a header field). For example in FIG. 1, hypervisor-A 114A implements a first VTEP associated with (IP address=IP-A, MAC address=MAC-A, VTEP label=VTEP-A), hypervisor-B 114B implements a second VTEP with (IP-B, MAC- B, VTEP-B), hypervisor-C 114C implements a third VTEP with (IP-C, MAC-C, VTEP-C), etc. Encapsulated packets may be sent via an end-to-end, bi-directional communication path (known as a tunnel) between a pair of VTEPs over physical network 104.

Resource Requirements of Packet Flow Monitoring

In practice, packet flow monitoring in SDN environment 100 may consume a lot of resources, especially to monitor flows among a substantially large number of VMs. One factor may be the transition from IPv4 to IPv6. The IPv4 address space is 32 bits, which offers around 4.2 billion possible addresses. However, with the rapid expansion of the number of internetworked devices, the demand of new IP addresses is continuously increasing and will lead to the eventual exhaustion of the IPv4 address space. In order to address the limitations of IPv4, the Internet Engineering Task Force (IETF) has developed the IPv6 suite of protocols and standards. By comparison, the size of an IPv6 address is 128 bits, which offers $3.4 \times 10^{38}$ possible addresses (i.e., 340 trillion, trillion, trillion addresses). The increased address space also reduces, if not eliminates, the need for network address translation to translate private addresses to public addresses. There are also more advanced features in IPv6, such as built-in security with encryption and authentication, improved Quality of Service (QoS), etc.

With the adoption of IPv6 to replace IPv4, the size of TCP/IP packets has increased to accommodate 128-bit IPv6 addresses instead of 32-bit IPv4 addresses. This means more space is required to store network flow information that includes source/destination IPv6 addresses. Using IPv4, a flow information record may be 128 bits long to identify a packet flow using 5 tuples, such as source address, destination address, source port number, destination port number, and protocol. In contrast, using IPv6, the size of the same 5 tuples increases to 192 bits.

Since there may hundreds or thousands of VMs in SDN environment 100, the additional 64 bits may add up to a significant amount of memory space consumed when monitoring a large number of packet flows. Consequently, more network bandwidth and latency is required to propagate flow information to consumers. Also, more computing power is required when reading, writing, searching, and parsing IPv6 addresses. Besides source and destination addresses, each flow is associated with other attribute information that takes up additional memory space and network bandwidth, as well as incurs higher latency during dissemination. This is undesirable because memory and storage on network devices (physical or virtual) are usually at much more premium as compared to usual personal computer workload(s).

Packet Flow Monitoring with Attribute-to-Identifier Mapping

Figure 2:
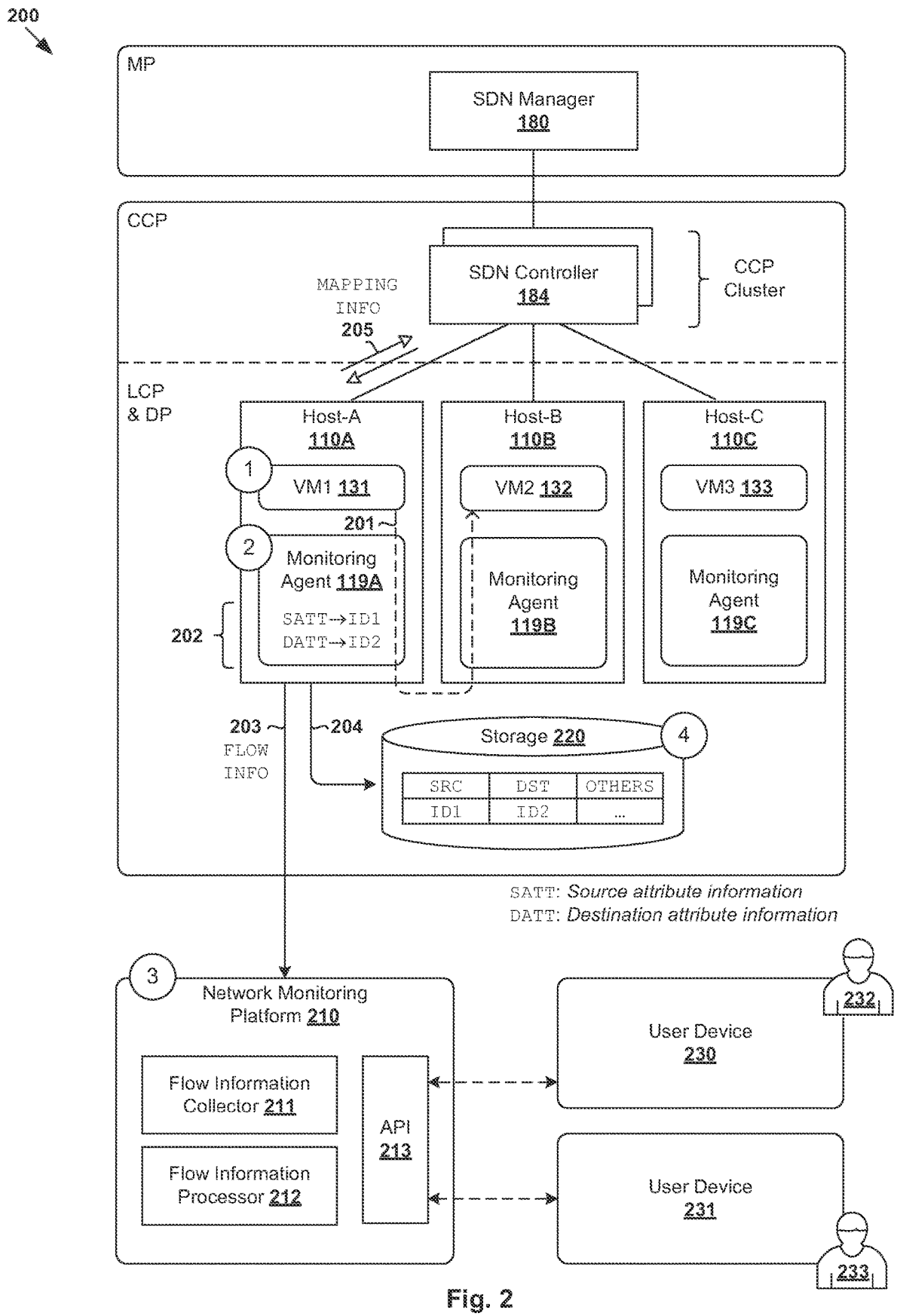
FIG. 2 is a schematic diagram illustrating an example architecture 200 for packet flow monitoring in the SDN environment 100 in FIG. 1.

According to examples of the present disclosure, attribute-to-identifier mapping may be implemented to reduce the burden on memory, storage, and network bandwidth consumption during packet flow monitoring in SDN environment 100. In more detail, FIG. 2 is a schematic diagram illustrating example architecture 200 for packet flow monitoring in SDN environment 100 in FIG. 1. It should be understood that, depending on the desired implementation, example architecture 200 may include additional and/or alternative components than that shown in FIG. 2. Example architecture 200 may include a flow record consumer in the form of network monitoring platform 210 that is capable of interacting with flow record source(s), such as host 110A/110B/110C. Here, host 110A/110B/110C is capable of monitoring network flows along a datapath between a source (e.g., VM1 131) and a destination (e.g., VM2 132), and generate flow information associated with the network flows.

Network monitoring platform 210 may be implemented using any suitable technology, including but not limited to VMware vRealize® Network Insight (vRNI) available from VMware, Inc. Depending on the desired implementation, network monitoring platform 210 may include flow information collector 211 and flow information processor 212. Collector 211 may be configured to interact with a flow record source (e.g., host 110A/110B/110C) and/or storage 220 to obtain flow information. Flow information processor 212 may be configured to process the flow information for network visibility and insight purposes, etc. User 232/233 operating client device 230/231 may access network monitoring platform 210 using any suitable user interface, such as application programming interface (API) 213, command-line interface (CLI), representational state transfer (REST) API, etc.

Figure 3:
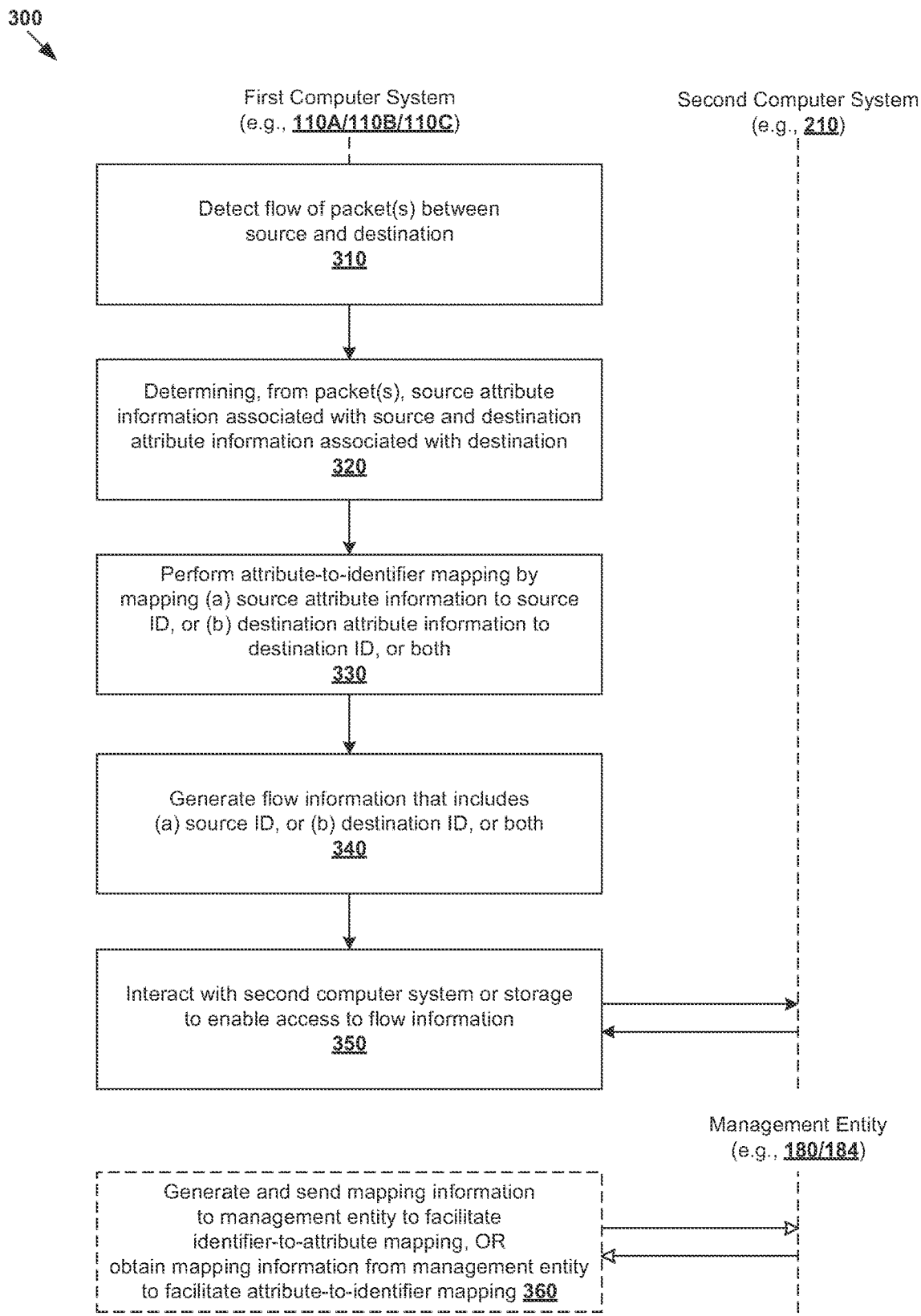
FIG. 3 is a flowchart of an example process for a first computer system to perform packet flow monitoring.

FIG. 3 is a flowchart of example process 300 for a first computer system to perform packet flow monitoring. Example process 300 may include one or more operations, functions, or actions illustrated by one or more blocks, such as 310 to 360. Depending on the desired implementation, various blocks may be combined into fewer blocks, divided into additional blocks, and/or eliminated. Examples of the present disclosure may be implemented using any suitable "first computer system" (e.g., host 110A/110B/110C using monitoring agent 119A/119B/119C), "second computer system" (e.g., network monitoring platform 210), "source" (e.g., VM 131/132/133/134) and management entity (e.g., 180/184).

At 310 in FIG. 3, host-A 110A may detect a flow of packet(s) along a datapath between a source and a destination. For example in FIG. 2, one packet flow is between source=VM1 131 supported by host-A 110A and destination=VM3 133 supported by host-B 110B via physical network 104. See 201 in FIGS. 1-2.

At 320 in FIG. 3, host-A 110A may determine (e.g., extract), from the packet(s), source attribute information associated with the source and destination attribute information associated with the destination. For example in FIG. 2, host-A 110A may determine that (source=VM1 131, destination=VM3 133) are associated with the source attribute information (denoted as SATT) and the destination attribute information (denoted as DATT), respectively.

At 330 in FIG. 3, host-A 110A may perform attribute-to-identifier mapping by (a) mapping the source attribute information to a source ID having a reduced size compared to the source attribute information, or (b) mapping the destination attribute information to a destination ID having a reduced size compared to the destination attribute information, or both. For example in FIG. 2, source attribute information (denoted as SATT) and the destination attribute information (denoted as DATT) may be mapped to (source ID=ID1, destination ID=ID2), respectively, for the packet flow from VM1 131 to VM2 132. See 202 in FIG. 2.

At 340 in FIG. 3, host-A 110A may generate flow information that includes (a) the source ID identifying the source, or (b) the destination ID identifying the destination, or both. Further, at 350, host-A 110A may interact with network monitoring platform 210, or storage 220 accessible by network monitoring platform 210, to enable network monitoring platform 210 to obtain the flow information. In the example in FIG. 2, host-A 110A may generate and store flow information (an entry of which is referred to as "flow record") in storage 220 accessible by network management platform 210. Alternatively or additionally, the flow information may be received or retrieved by network management platform 210 from host-A 110A.

At 350 in FIG. 3, host-A 110A may send mapping information to management entity 180/184 and/or network monitoring platform 210 to facilitate identifier-to-address mapping (i.e., a reversal of attribute-to-identifier mapping). The mapping information may specify mappings (source attribute information, source ID) and (destination attribute information, destination ID). This way, based on the mapping information, network monitoring platform 210 may translate (source ID, destination ID) to (source attribute information, destination attribute information) when analyzing the flow information. Alternatively, prior to detecting the flow of packet(s) at block 310, host-A 110A may obtain the mapping information from management entity 180/184. In this case, it is not necessary for host-A 110A to calculate any hash values during packet flow monitoring to improve the efficiency of attribute-to-identifier mapping at block 330.

Using examples of the present disclosure, the amount of storage space required for storing and propagating flow information may be reduced by generating flow information specifying (source ID, destination ID) instead of (source attribute information, destination attribute information). As there might be millions of packet flows being monitored in SDN environment 100, any improvement in memory, storage and network bandwidth utilization may be quite significant. Examples of the present disclosure may be implemented for any suitable packet flow monitoring protocol, such as Internet protocol flow information export (IPFIX) developed by the Internet Engineering Task Force (IETF), NetFlow, sampled flow (sFlow), etc. Various examples will be discussed using FIGS. 4-7 below.

Figure 4:
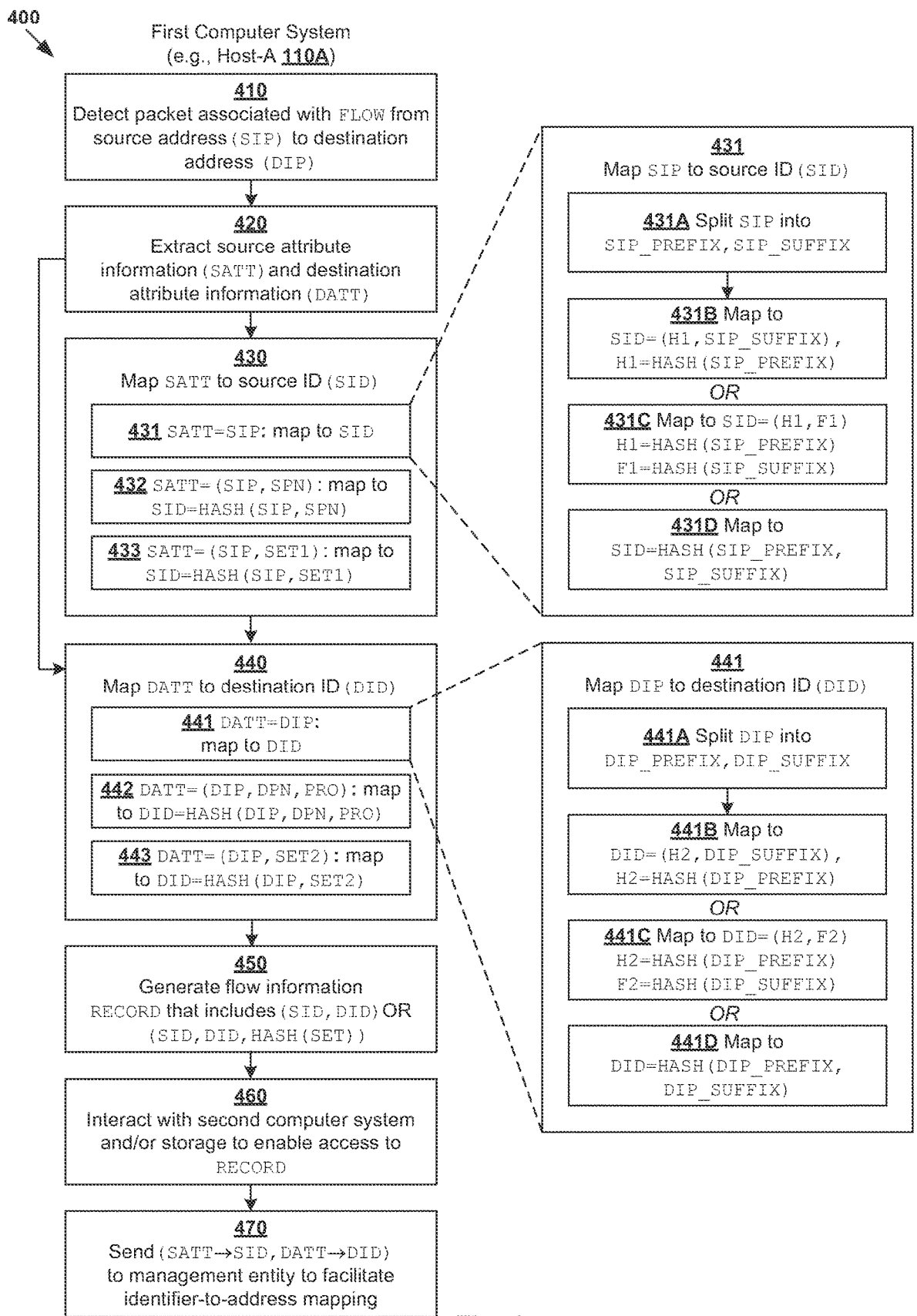
FIG. 4 is a flowchart of an example detailed process for a first computer system to perform packet flow monitoring.
Figure 5:
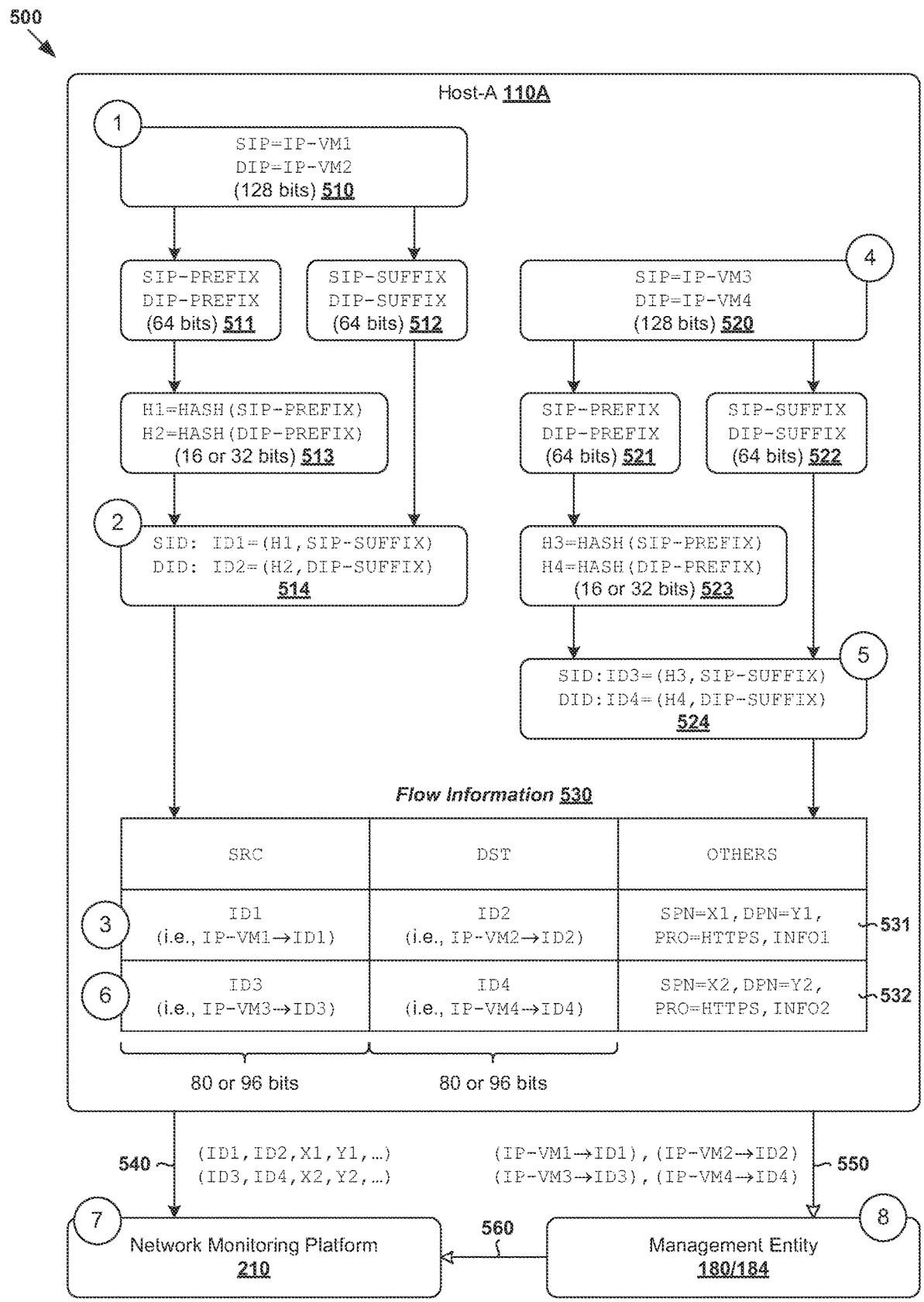
FIG. 5 is a schematic diagram illustrating a first example of attribute-to-identifier mapping during packet flow monitoring.
Figure 6:
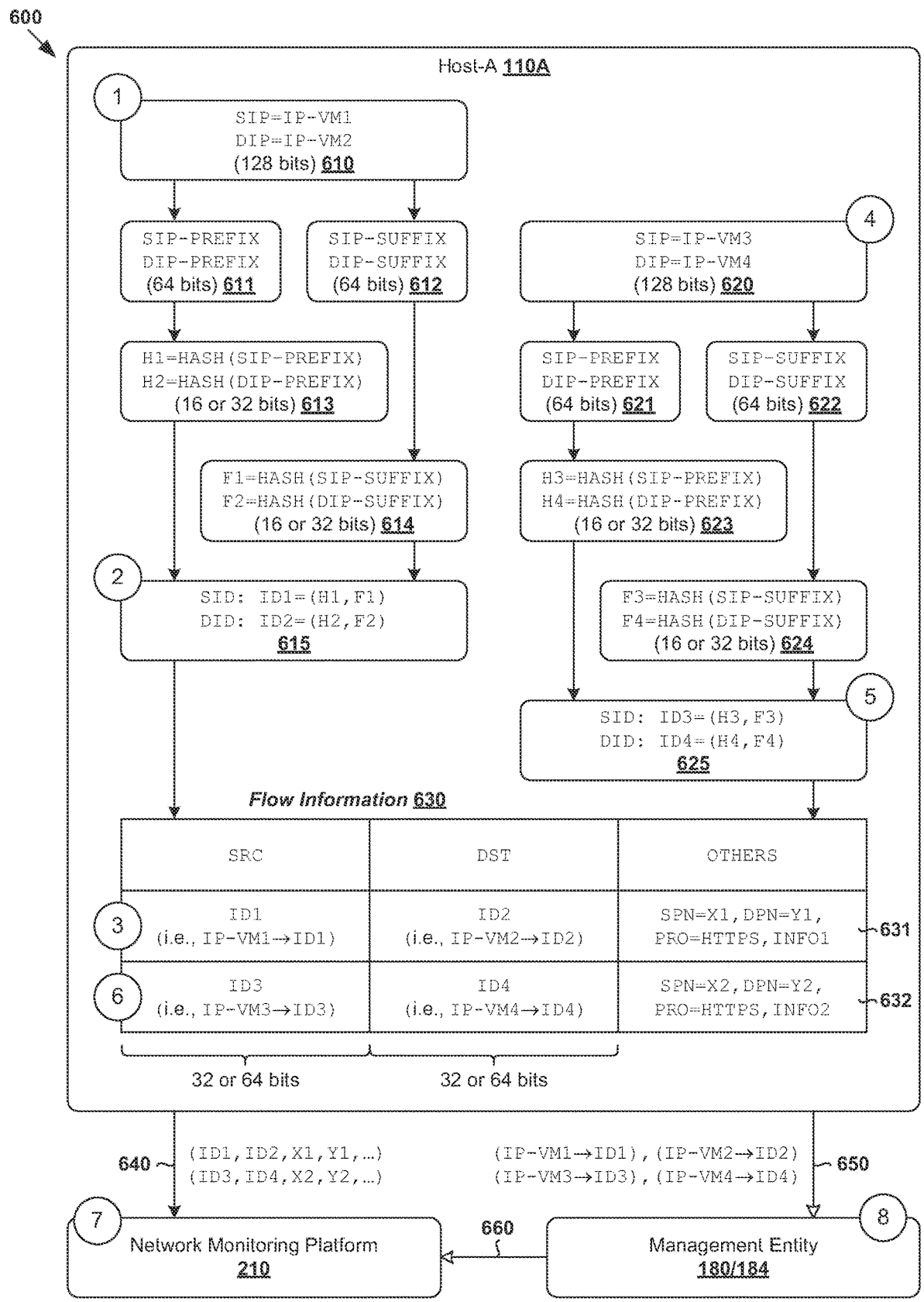
FIG. 6 is a schematic diagram illustrating a second example of attribute-to-identifier mapping during packet flow monitoring.

In the examples in FIGS. 4-6, the source/destination attribute information may be in the form of a source/destination address, in which case (SATT=IP-VM1, DATT=IP-VM2). As will be described below, the attribute-to-identifier mapping at block 330 may involve address-to-identifier mapping by splitting the source/destination address into multiple portions, such as (a) a prefix and (b) a suffix. Using 128-bit IPv6 addressing as an example, the term "prefix" may refer generally to the first 64 bits that represent the network address and subnet address portions of a 128-bit IPv6 address. The term "suffix" may refer generally to the last 64 bits that represent the device address portion of a 128-bit IPv6 address. In the example in FIG. 2, source address=IP-VM1 associated with VM1 131 may be split into (a) a 64-bit prefix and (b) a 64-bit suffix. In this case, the source ID may be in the form of a 16 or 32-bit value (e.g., unsigned number, hash value).

Any suitable approach may be used to calculate the source/destination ID. In a first example in FIG. 5, source ID=ID1 may include (a) a first hash value that is calculated based on the prefix and (b) the suffix. In a second example in FIG. 6, source ID=ID1 may include (a) a first hash value that is calculated based on the prefix and (b) a second hash value that is calculated based on the suffix. In a third example, source ID=ID1 may be a third hash value that is calculated based on both the prefix and the suffix. Any suitable hash function may be used to map the prefix, the suffix, or both, to a fixed-size ID that uniquely identifies the source/destination in SDN environment 100.

Although IPv6 provides a huge IP address space, realistically, a data center may rarely require the entire address space. Based on this premise, an IPv6 address may be mapped to an identifier (ID) having a reduced size compared to the IPv6 address. The size of the ID (e.g., 32 or 64-bit hash value) may be configurable based on how the IPv6 address range is used within the data center. As SDN environment 100 increases in scale and complexity, any improvement in memory, storage and network bandwidth consumption using flow record optimization according to the examples of the present disclosure may lead to better system performance and reduced downtime.

Further, as will be discussed using FIG. 7, the source/destination attribute information may include multiple attributes associated with the flow, such as source/destination address, source/destination port number, protocol information, any combination thereof, etc. For example, source attribute information SATT=(source address=IP-VM1, source port number=X1). In another example, destination attribute information DATT=(destination address=IP-VM2, destination port number=Y1, protocol=PRO2). In practice, the source/destination attribute information may include any other characteristic(s) associated with the flow (to be discussed below).

Attribute-to-Identifier Mapping

FIG. 4 is a flowchart of example detailed process 400 for a first computer system to perform packet flow monitoring in an SDN environment. Example process 400 may include one or more operations, functions, or actions illustrated by one or more blocks, such as 410 to 470. Depending on the desired implementation, various blocks may be combined into fewer blocks, divided into additional blocks, and/or eliminated. Some examples will be described using FIG. 5, which is a schematic diagram illustrating first example 500 of attribute-to-identifier mapping during packet flow monitoring.

It should be understood that packet flow monitoring according to the examples of the present disclosure may be performed by a source host, or a destination host, or both. For example, source host=host-A 110A may monitor first packet flow 201 from VM1 131 on host-A 110A to VM2 132 on host-B 110B. In another example, destination host=host-A 110A may monitor second packet flow 191 from VM3 133 on host-C 110C to VM4 134 on host-A 110A. The examples below may be implemented by host 110A/110B/110C using any suitable component, such as monitoring agent 119A/119B/119C implemented by hypervisor 114A/114B/114C. The following notations will be used below: SIP=source IPv6 address, DIP=destination IPv6 address, SPN=source port number, DPN=destination port number, PRO=protocol, OTH=any other characteristic(s) associated with a flow besides 5-tuple information, etc.

(a) Packet Flow Detection

At 410-420 in FIG. 4, in response to detecting a flow of packet(s), host-A 110A may determine or extract flow information from content of the packet(s). For example, consider a packet flow from source=VM1 131 on host-A 110A to destination=VM2 132 on host-B 110B. In this case, the flow information may include the following 5-tuple information: SIP=IP-VM1 associated with VM1 131, DIP=IP-VM2 associated with VM2 132, SPN=X1, DPN=Y1, PRO=HTTPS, etc.

In practice, the packet(s) may be detected at any suitable detection or monitoring point along the datapath between source=VM1 131 and destination=VM2 132. For example, the detection point may be a network element such as VNIC (e.g., VNIC1 151 or VNIC2 152), logical port (e.g., LP1 161 or LP2 162), distributed firewall (e.g., DFW1 171 or DFW2 172), logical switch (e.g., implemented by virtual switch 115A/115B), logical router (e.g., implemented by DR instance 117A/117B), etc.

(b) Mapping

At 430-440 in FIG. 4, host-A 110A (e.g., monitoring agent 119A) may perform attribute-to-identifier mapping to map source and destination attribute information (SATT,DATT) to respective identifiers (SID, DID). Depending on the desired implementation, the source attribute information (SATT) may include source address (SIP), source port number (SPN), protocol information (PRO), or any combination thereof.

Similarly, the destination attribute information (DATT) may include destination address (DIP), destination port number (DPN), protocol information (PRO), or any combination thereof. Besides 5-tuple information, the source/destination attribute information may include any suitable set of one or more characteristics associated with the flow (e.g., SET1 at 433 and SET2 at 443 in FIG. 4), including but not limited to TCP flag information, flow metric information (e.g., duration, packet loss, jitter, round trip time, etc.), ingress/egress interface information, overlay network information (e.g., VTEP information), etc.

For example, at 431-433 in FIG. 4, source ID (SID) may be a hash value that is generated based on source attribute information in one of the following forms: SATT=SIP, SATT=(SIP, SPN), and SATT=(SIP, SET1), where SET1=a first set of characteristics associated with the source and/or flow. Similarly, at 441-443, destination ID (DID) may be a hash value that is generated based on destination attribute information in one of the following forms: DATT=DIP, DATT=(DIP, DPN, PRO), and DATT=(DIP, SET2), where SET2=a second set of characteristics associated with the destination and/or flow. These examples will be discussed further using FIGS. 4-7. Compared to respective sets of attribute information (SATT, DATT), SID=source ID and DID=destination ID have a reduced size such that flow information that includes (SID, DID) may be stored and propagated more efficiently.

First Example: Prefix Size Reduction (a) Splitting and Mapping

In the case of (SATT=SIP, DATT=DIP), address-to-identifier mapping may be performed, such as from 128-bit IPv6 addresses to identifiers. In more detail, an IPv6 address may be divided into three portions: (1) a network address, (2) a subnet address and (3) a device address. The network address is identified using the first 48 bits in the IPv6 address. The subnet address is identified using the $49^{th}$ through to $64^{th}$ bits. The device address is identified using the last 64 bits. An IPv6 address may be represented using a colon hexadecimal notation that includes eight groupings of numbers.

Based on the above, block 431 may involve splitting source address SIP into two portions: (1) SIP-PREFIX=a 64-bit prefix that includes the network and subnet addresses, and (2) SIP-SUFFIX=64-bit suffix that is the device address associated with source=VM1 131. The size of the SIP-PREFIX may then be reduced by applying a hash function on the prefix to obtain a hash value (denoted as H1) that is 16 or 32 bits. This way, address SIP=(SIP-PREFIX, SIP-SUFFIX) may be mapped to a corresponding source identifier denoted as SID=(H1, SIP-SUFFIX), which uniquely identifies source=VM1 131 within SDN environment 100. See 431A-B in FIG. 4.

Similarly, block 441 may involve splitting destination address DIP into (1) DIP-PREFIX=a 64-bit prefix that includes the network and subnet addresses, and (2) DIP-SUFFIX=64-bit suffix that is the device address associated with destination=VM2 132. The size of the DIP-PREFIX may then be reduced by applying a hash function on the prefix to obtain a hash value (denoted as H2) that is 16 or 32 bits. This way, address DIP=(DIP-PREFIX, DIP-SUFFIX) may be mapped to a corresponding destination identifier denoted as DID=(H2, DIP-SUFFIX), which uniquely identifies destination=VM2 132 in SDN environment 100. See 441A-B in FIG. 4.

Turning now to FIG. 5, for a first packet flow between VM1 131 and VM2 132, source host-A 110A may map 128-bit SIP=IP-VM1 to reduced-size SID=ID1. For example, IP-VM1=2022:0DA8:ABCD:0012:0000:0000:0000:0001 may be split into (1) SIP-PREFIX=2022:0DA8:ABCD:0012 (i.e., first four groupings), and (2) SIP-SUFFIX=0000:0000:0000:0001 (i.e., last four groupings). In this case, SID is a concatenation of H1=HASH(SIP-PREFIX)=HASH(2022:0DA8:ABCD:0012) and SIP-SUFFIX. Further, DIP=IP-VM2 may be mapped to DID=ID2, which includes a second hash value (H2) generated from DIP-PREFIX, and unchanged DIP-SUFFIX of IP-VM2. See first packet flow 201 in FIGS. 1-2, and 510-514 in FIG. 5.

For a second packet flow between VM3 133 and VM4 134, destination host-A 110A may map 128-bit SIP=IP-VM3 to SID=ID4, which includes a first hash value (H3) generated from SIP-PREFIX of IP-VM3, and the original SIP-SUFFIX of IP-VM4. Further, DIP=IP-VM4 may be mapped to DID=ID4, which includes a second hash value (H4) generated from DIP-PREFIX, and the original DIP-SUFFIX of IP-VM4. See second packet flow 191 in FIG. 1, and 520-524 in FIG. 5.

(b) Flow Information Propagation

At 450 in FIG. 4, host-A 110A may generate flow information associated with each network flow detected. In the example in FIG. 5, a first flow record specifies (SID=ID1, DID=ID2) instead of (SIP=IP-VM1, DIP=IP-VM2), as well as other record information (e.g., SPN=X1, DPN=Y1, PRO=HTTPS, etc.) associated with first packet flow 201. A second flow record specifies (SID=ID3, DID=ID4) instead of (SIP=IP-VM3, DIP=IP-VM4), as well as other record information (e.g., SPN=X2, DPN=Y2, PRO=HTTPS, etc.) associated with second packet flow 191. See 530-532 in FIG. 5.

At 460 in FIG. 4, host-A 110A may interact with network monitoring platform 210 to enable network monitoring platform 210 to obtain (e.g., receive or retrieve) flow information 530. Alternatively, host-A 110A may store flow information 530 in storage 220 (shown in FIG. 2) accessible by network monitoring platform 210. In the example in FIG. 5, first record 531 includes SID=ID1 and DID=ID2. Depending on the hash function used, the size of each ID may be 80 bits (i.e., 16-bit hash value+64-bit suffix) or 96 bits (i.e., 32-bit hash value+64-bit suffix) compared to a 128-bit IPv6 address. Similarly, second record 532 includes SID=ID3 and DID=ID4, which are each 80 or 96 bits instead of 128 bits. See 540 in FIG. 5.

Using attribute-to-identifier mapping according to the examples of the present disclosure, the size of in each record 531/532 may be reduced. In the examples in FIG. 5, since a hash value is used instead of the actual prefix for the IPv6 addresses, the amount of memory and storage required to store flow information 530 may be reduced. The network bandwidth required to propagate records 531-532 over the network to flow information consumers such may also be reduced. Since the number of flows monitored could easily run into millions, the reduction in memory space and network bandwidth may be quite significant in SDN environment 100.

(c) Mapping Information Propagation

At 470 in FIG. 4, host-A 110A may send mapping information that associates an IPv6 address with an ID calculated by host-A 110A to management entity 180/184. In the example in FIG. 5, mapping information specifying associations (SIP=IP-VM1, SID=ID1) and (DIP=IP-VM2, DID=ID2) may be propagated towards SDN controller 184 and/or SDN manager 180 via control-plane channel 101. The mapping information may also be propagated towards network monitoring platform 210 to facilitate identifier-to-address mapping, such as when processing flow information 530 by processor 212. See 550-560 in FIG. 5.

Second Example: Prefix and Suffix Size Reduction

FIG. 6 is a schematic diagram illustrating second example 600 of attribute-to-identifier mapping during packet flow monitoring in SDN environment 100. Compared to the prefix size reduction examples in FIG. 5, both the prefix and suffix may be shortened during attribute-to-identifier mapping to further reduce the size of the original source/destination IP address. See also 431C and 441C in FIG. 4.

At 610, 611 and 612 in FIG. 6, host-A 110A may split (1) source address SIP=IP-VM1 associated with source=VM1 131 into (SIP-PREFIX, SIP-SUFFIX), and (2) destination address DIP associated with destination=VM2 132 into (DIP-PREFIX, DIP-SUFFIX). At 613, 614 and 615, SIP=IP-VM1 may be mapped to SID=(H1, F1)=ID1, where H1=HASH(SIP-PREFIX) and F1=HASH(SIP-SUFFIX). Using hash values (H1, F1) that are each 16 or 32 bits, SID will be 32 or 64 bits compared to the 128-bit IP-VM1. Similarly, DIP=IP-VM2 may be mapped to DID=(H2, F2)=ID2, where H2=HASH(DIP-PREFIX) and F1=HASH(DIP-SUFFIX). Using hash values (H2, F2) that are each 16 or 32 bits, DID will be 32 or 64 bits compared to the 128-bit IP-VM1.

At 620, 621 and 622 in FIG. 6, host-A 110A may split (1) source address SIP=IP-VM3 associated with source=VM3 133 into (SIP-PREFIX, SIP-SUFFIX), and (2) destination address DIP associated with destination=VM4 132 into (DIP-PREFIX, DIP-SUFFIX). At 623, 624 and 625, SIP=IP-VM3 may be mapped to SID=(H3, F3)=ID3, where H3=HASH(SIP-PREFIX) and F3=HASH(SIP-SUFFIX). Using hash values (H3, F3) that are each 16 or 32 bits, SID will be 32 or 64 bits compared to the 128-bit IP-VM4. Similarly, DIP=IP-VM4 may be mapped to DID=(H4, F4)=ID4, where H4=HASH(DIP-PREFIX) and F4=HASH(DIP-SUFFIX). Using hash values (H4, F4) that are each 16 or 32 bits, DID will be 32 or 64 bits compared to the 128-bit IP-VM4.

At 630, 631 and 632 in FIG. 6, host-A 110A may generate flow information that includes first record=(ID1, ID2, X1, Y1, HTTPS) associated with first packet flow 201 and second record=(ID3, ID4, X2, Y2, HTTPS) associated with second packet flow 191. Here, (SID=ID1, DID=ID2) uniquely identify source VM1 131 and destination VM2 132, respectively. Similarly, (SID=ID3, DID=ID4) uniquely identify source VM3 133 and destination VM4 134, respectively.

At 640 in FIG. 6, flow information 630 may be propagated towards network monitoring platform 210 in a more resource-efficient manner. At 650-660 in FIG. 6, mapping information specifying (SIP=IP-VM1, SID=ID1) and (DIP=IP-VM2, DID=ID2) may be propagated towards management entity 180/184 to facilitate subsequent identifier-to-address mapping by network monitoring platform 210.

Although some examples are shown in FIGS. 5-6, it should be understood that any suitable approach may be used to generate (SID, DID) from (SIP, DIP). For example, another way is to apply a single hash function on both the prefix and suffix of each source/destination address. In this case, SID=HASH(SIP-PREFIX,SIP-SUFFIX) may be a 16 or 32 bit hash value. Similarly, DID=HASH(DIP-PREFIX, DIP-SUFFIX) may be a 16 or 32 bit hash value. The same hash functions may be used, or different ones. Again, (SID, DID) may be generated to uniquely identify respective source and destination in SDN environment 100. See 431D and 441D in FIG. 4.

It should be understood that it is not necessary for host 110A/110B/110C to calculate hash value(s) each and every time a packet is detected. For example, once (SIP=IP-VM1, SID=ID1) and (DIP=IP-VM2, DID=ID2) are determined, the mapping information may be used for subsequent packets. Depending on the desired implementation, host 110A/110B/110C may perform attribute-to-identifier mapping based on mapping information received from management entity 180/184 via control plane channel 101/102/103. In this case, hash value calculations discussed above may be performed by management entity 180/184 instead of host 110A/110B/110C to further improve efficiency.

Although described using host-A 110A as a "first computer system," it should be understood that any suitable entity that generates flow information may implement examples of the present disclosure. One example is a network element (e.g., physical or logical router) that detects packet flows, and generates flow information (e.g., state information) to facilitate stateful packet processing. Similarly, the network element may perform attribute-to-identifier mapping to reduce memory/storage consumption. The network element may interact with a "second computer system" to facilitate access to the flow information generated.

Third Example: Multiple Attributes

According to examples of the present disclosure, other form(s) of source/destination attribute information may be mapped to a source/destination identifier. FIG. 7 is a schematic diagram illustrating a third example of attribute-to-identifier mapping during packet flow monitoring. In this example, there are five packet flows among VMs 131-135.

At 710-740 in FIG. 7, there are three packet flows to destination=VM4 134, there are three sources. At 710, a first source is VM1 131 associated with (SIP=IP-VM1, SPN=65123). At 720, a second source is VM2 132 associated with (SIP=IP-VM2, SPN=65124). At 730, a source is VM3 133 associated with (SIP=IP-VM3, SPN=65144). At 740, destination=VM4 134 is associated with (DIP=IP-VM4, DPN=443, PRO=TCP).

At 750-770 in FIG. 7, there are two packet flows to destination=VM5 135. At 750, a first source is VM2 132 associated with (SIP=IP-VM2, SPN=75124). At 760, a second source is VM3 133 associated with (SIP=IP-VM3, SPN=75134). At 770, destination=VM5 135 associated with (DIP=IP-VM5, DPN=554, PRO=UDP).

At 781-785 in FIG. 7, flow information prior to attribute-to-identifier mapping is shown. For each flow, a corresponding flow record may specify 5-tuple information (SIP, SPN, DIP, DPN, PRO). Additionally, each flow record may specify a set of one or more characteristics associated with the flow, such as SET1 for a first packet flow from VM1 131 to VM4 134, SET2 for packet flows from VM2 132 to respective VM4 134 and VM5 135, SET3 for packet flows from VM3 133 to respective VM4 134 and VM5 135, etc. Any suitable characteristic may be included, such as egress interface, etc.

At 790 in FIG. 7, attribute-to-identifier mapping may be performed according to examples of the present disclosure to reduce the size of each flow record. At 791, a first flow record with a reduced size compared to original record 781 may be generated to include (SID=ID1, DID=ID4, ID6), where ID1=HASH(DIP=IP-VM1), ID4=HASH(DIP=IP-VM4, DPN=443, PRO=TCP) and ID6=HASH(SET1). At 792, a second flow record with a reduced size compared to original record 782 may be generated to include (SID=ID2, DID=ID4, ID7), where ID2=HASH(DIP=IP-VM2) and ID7=HASH(SET2). At 793, a third flow record with a reduced size compared to original record 783 may be generated to include (SID=ID3, DID=ID4, ID8), where ID3=HASH(DIP=IP-VM3) and ID8=HASH(SET3). This way, ID4 may be generated and used in all three flow records 791-793.

Similarly, at 794, a fourth flow record with a reduced size compared to original record 784 may be generated to include (SID=ID2, DID=ID5, ID7), where ID5=HASH(DIP=IP-VM5, DPN=554, PRO=UDP) while ID2 and ID7 have been defined above. At 795, a fifth flow record with a reduced size compared to original record 785 may be generated to include (SID=ID3, DID=ID5, ID8), where ID3, ID5 and ID8 have been defined above. Using examples of the present disclosure, flow records 791-795 may be stored and propagated to network monitoring platform 210 in a more resource-efficient manner.

As discussed using FIG. 4, attribute-to-identifier mapping may be performed based on mapping information from management entity 180/184, such as (SATT=IP1, SID=ID1) and (DATT=(IP4, 443, TCP), DID=ID4) for the packet flow from VM1 131 to VM4 134 (see 710, 740, 781, 791 in FIG. 7), and so on. Alternatively or additionally, host-A 110A supporting VM1 131 may distribute the mapping information to one or more entities to facilitate the reverse identifier-to-attribute mapping.

In practice, the destination/service side of the flows may not have many variations. In this case, the destination attribute information may be limited by the number of services and applications in the environment. Using examples of the present disclosure, repetitive patterns in flow information may be identified to facilitate flow record optimization using attribute-to-identifier mapping. Any suitable combination of attribute information items may be mapped to an identifier.

Container Implementation

Although discussed using VMs 131-136, it should be understood that packet flow monitoring may be performed for other virtualized computing instances, such as containers, etc. The term "container" (also known as "container instance") is used generally to describe an application that is encapsulated with all its dependencies (e.g., binaries, libraries, etc.). For example, multiple containers may be executed as isolated processes inside VM1 131, where a different VNIC is configured for each container. Each container is "OS-less", meaning that it does not include any OS that could weigh 11 s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 7. For example, a computer system capable of acting as host 110A/110B/110C may be deployed in SDN environment 100 to perform examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-units.

The invention claimed is:

1. A method for a first computer system to perform packet flow monitoring, wherein the method comprises:
   detecting a flow of one or more packets along a datapath between a source and a destination, wherein the source or the destination is a virtualized computing instance supported by the first computer system;
   determining, from the one or more packets, source attribute information associated with the source and destination attribute information associated with the destination;
   performing attribute-to-identifier mapping by (a) mapping the source attribute information to a source identifier having a reduced size compared to the source attribute information, or (b) mapping the destination attribute information to a destination identifier having a reduced size compared to the destination attribute information, or both;
   generating flow information that includes (a) the source identifier identifying the source, or (b) the destination identifier identifying the destination, or both; and
   interacting with a second computer system, or storage accessible by the second computer system, to enable the second computer system to obtain the flow information.

2. The method of claim 1, wherein:
   the method is performed by a host computer in a software-defined network (SDN) environment, the host computer comprising virtualization software that allocates hardware resources of the host to support one or more virtual computing instances (VCI), the virtualization software implementing a virtual switch that is part of a logical switch in an overlay network and a distributed router (DR) instance that is part of a logical DR in the overlay network; and
   the method further comprises:
      generating and sending mapping information to a management entity in the SDN environment or the second computer system to facilitate identifier-to-attribute mapping, wherein the mapping information specifies (a) the source identifier that is calculated by the first computer system to unique identify the source, (b) the destination identifier that is calculated by the first computer system to unique identify the destination, or both.

3. The method of claim 1, wherein performing the attribute-to-identifier mapping comprises:
   prior to detecting the flow, obtaining mapping information from a management entity to facilitate the attribute-to-identifier mapping, wherein the mapping information specifies (a) the source identifier that uniquely identifies the source, (b) the second identifier that uniquely identifies the destination, or both.

4. The method of claim 1, wherein performing the attribute-to-identifier mapping comprises:
   mapping the source attribute information in the form of a source address associated with the source to the source identifier in the form of a 16 or 32-bit value.

5. The method of claim 1, wherein performing the attribute-to-identifier mapping comprises:
   mapping the source attribute information in the form of a source address associated with the source to by splitting the source address into a prefix and a suffix; and
   mapping the source address to the source identifier that includes at least one of the following: (a) a first hash value that is calculated based on the prefix; (b) a second hash value that is calculated based on the suffix; and (c) a third hash value that is calculated based on both the prefix and the suffix.

6. The method of claim 1, wherein performing the attribute-to-identifier mapping comprises:
   mapping the source attribute information to the source identifier, wherein the source attribute information includes one or more of the following: source address associated with the source, source port number, and protocol information associated with the flow.

7. The method of claim 1, wherein performing the attribute-to-identifier mapping comprises:
   mapping the destination attribute information to the destination identifier, wherein the destination attribute information includes one or more of the following:
      destination address associated with the destination, destination port number, and protocol information associated with the flow.

8. A non-transitory computer-readable storage medium that includes a set of instructions which, in response to execution by a processor of a first computer system, cause the processor to perform operations comprising:
   detecting a flow of one or more packets along a datapath between a source and a destination, wherein the source or the destination is a virtualized computing instance supported by the first computer system;
   determining, from the one or more packets, source attribute information associated with the source and destination attribute information associated with the destination;
   performing attribute-to-identifier mapping by (a) mapping the source attribute information to a source identifier having a reduced size compared to the source attribute information, or (b) mapping the destination attribute information to a destination identifier having a reduced size compared to the destination attribute information, or both;
   generating flow information that includes (a) the source identifier identifying the source, or (b) the destination identifier identifying the destination, or both; and
   interacting with a second computer system, or storage accessible by the second computer system, to enable the second computer system to obtain the flow information.

9. The non-transitory computer-readable storage medium of claim 8, wherein:
   the first computer system is a host computer in a software-defined network (SDN) environment, the host computer comprising virtualization software that allocates hardware resources of the host to support one or more virtual computing instances (VCI), the virtualization software implementing a virtual switch that is part of a logical switch in an overlay network and a distributed router (DR) instance that is part of a logical DR in the overlay network; and
   the operations further comprise:
      generating and sending mapping information to a management entity in the SDN environment or the second computer system to facilitate identifier-to-attribute mapping, wherein the mapping information specifies (a) the source identifier that is calculated by the first computer system to unique identify the source, (b) the destination identifier that is calculated by the first computer system to unique identify the destination, or both;

generating and sending mapping information to a management entity or the second computer system to facilitate identifier-to-attribute mapping, wherein the mapping information specifies (a) the source identifier that is calculated by the first computer system to unique identify the source, (b) the destination identifier that is calculated by the first computer system to unique identify the destination, or both.

10. The non-transitory computer-readable storage medium of claim 8, wherein performing the attribute-to-identifier mapping comprises:

prior to detecting the flow, obtaining mapping information from a management entity to facilitate the attribute-to-identifier mapping, wherein the mapping information specifies (a) the source identifier that uniquely identifies the source, (b) the second identifier that uniquely identifies the destination, or both.

11. The non-transitory computer-readable storage medium of claim 8, wherein performing the attribute-to-identifier mapping comprises:

mapping the source attribute information in the form of a source address associated with the source to the source identifier in the form of a 16 or 32-bit value.

12. The non-transitory computer-readable storage medium of claim 8, wherein performing the attribute-to-identifier mapping comprises:

mapping the source attribute information in the form of a source address associated with the source to by splitting the source address into a prefix and a suffix; and mapping the source address to the source identifier that includes at least one of the following: (a) a first hash value that is calculated based on the prefix; (b) a second hash value that is calculated based on the suffix; and (c) a third hash value that is calculated based on both the prefix and the suffix.

13. The non-transitory computer-readable storage medium of claim 8, wherein performing the attribute-to-identifier mapping comprises:

mapping the source attribute information to the source identifier, wherein the source attribute information includes one or more of the following: source address associated with the source, source port number, and protocol information associated with the flow.

14. The non-transitory computer-readable storage medium of claim 8, wherein performing the attribute-to-identifier mapping comprises:

mapping the destination attribute information to the destination identifier, wherein the destination attribute information includes one or more of the following: destination address associated with the destination, destination port number, and protocol information associated with the flow.

15. A first computer system, comprising:
one or more processors; and
a non-transitory computer-readable storage medium that includes a set of instructions which, in response to execution by the one or more processors, cause the one or more processors to perform operations comprising:
detecting a flow of one or more packets along a datapath between a source and a destination, wherein the source or the destination is a virtualized computing instance supported by the first computer system;

determining, from the one or more packets, source attribute information associated with the source and destination attribute information associated with the destination;

performing attribute-to-identifier mapping by (a) mapping the source attribute information to a source identifier having a reduced size compared to the source attribute information, or (b) mapping the destination attribute information to a destination identifier having a reduced size compared to the destination attribute information, or both;

generating flow information that includes (a) the source identifier identifying the source, or (b) the destination identifier identifying the destination, or both; and interacting with a second computer system, or storage accessible by the second computer system, to enable the second computer system to obtain the flow information.

16. The first computer system of claim 15, wherein:
the first computer system is a host computer in a software-defined network (SDN) environment, the host computer comprising virtualization software that allocates hardware resources of the host to support one or more virtual computing instances (VCI), the virtualization software implementing a virtual switch that is part of a logical switch in an overlay network and a distributed router (DR) instance that is part of a logical DR in the overlay network; and the operations further comprise:
generating and sending mapping information to a management entity in the SDN environment or the second computer system to facilitate identifier-to-attribute mapping, wherein the mapping information specifies (a) the source identifier that is calculated by the first computer system to unique identify the source, (b) the destination identifier that is calculated by the first computer system to unique identify the destination, or both.

17. The first computer system of claim 15, wherein performing attribute-to-identifier mapping comprises:

prior to detecting the flow, obtaining mapping information from a management entity to facilitate the attribute-to-identifier mapping, wherein the mapping information specifies (a) the source identifier that uniquely identifies the source, (b) the second identifier that uniquely identifies the destination, or both.

18. The first computer system of claim 15, wherein performing attribute-to-identifier mapping comprises mapping the source attribute information in the form of a source address associated with the source to the source identifier in the form of a 16 or 32-bit value.

19. The first computer system of claim 15, wherein performing attribute-to-identifier mapping by comprises:

mapping the source attribute information in the form of a source address associated with the source to by splitting the source address into a prefix and a suffix; and mapping the source address to the source identifier that includes at least one of the following: (a) a first hash value that is calculated based on the prefix; (b) a second hash value that is calculated based on the suffix; and (c) a third hash value that is calculated based on both the prefix and the suffix.

20. The first computer system of claim 15, wherein performing attribute-to-identifier mapping comprises:

mapping the source attribute information to the source identifier, wherein the source attribute information includes one or more of the following: source address associated with the source, source port number, and protocol information associated with the flow.

21. The first computer system of claim 15, wherein performing attribute-to-identifier mapping comprises:
mapping the destination attribute information to the destination identifier, wherein the destination attribute information includes one or more of the following: destination address associated with the destination, destination port number, and protocol information associated with the flow.

\* \* \* \* \*